United States Patent Office 2,905,508
Patented Sept. 22, 1959

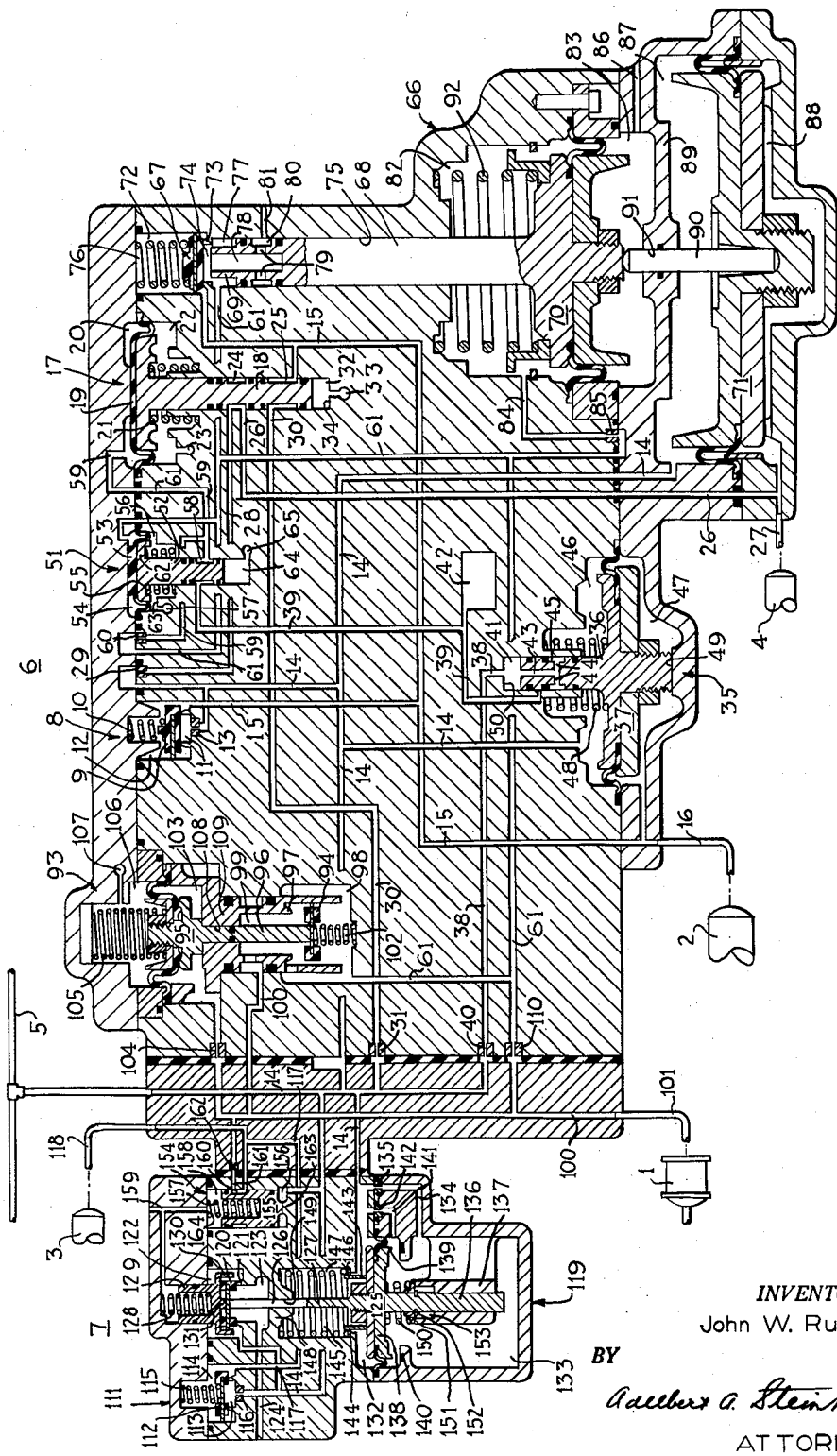

2,905,508

FLUID PRESSURE BRAKE CONTROL APPARATUS WITH HIGH PRESSURE EMERGENCY FEATURE

John W. Rush, Pittsburgh, Pa., assignor to Westinghouse Air Brake Company, Wilmerding, Pa., a corporation of Pennsylvania Application December 29, 1955, Serial No. 556,160

1 Claim. (Cl. 303—85)

This invention relates to fluid pressure brake control apparatus, and more particularly to the graduated release type in which the degree of brake application and release is varied according to the extent of reduction and restoration, respectively, in pressure of fluid in a brake pipe relative to a datum pressure in a control reservoir.

The prime object of this invention is to provide a fluid pressure brake control apparatus of the graduated release type which will regulate the degree and rate of build-up in brake cylinder pressure according to the rate of reduction in brake pipe pressure.

It is another object of the invention to provide a fluid pressure brake apparatus of the graduated release type which will respond to a rate of reduction in brake pipe pressure at an emergency rate to effect a rate and degree of build-up in brake cylinder pressure greater than that which prevails during the effecting of a service application of the brakes.

It is still another object of the invention to provide a fluid pressure brake control apparatus of the graduated release type which will respond to a reduction in brake pipe pressure either to a certain degree or at a certain rate to effect a degree and rate of build-up in brake cylinder pressure greater than that which prevails during the effecting of a service application of the brakes.

Other objects and advantages of this invention will become apparent from the following more detailed description of such invention when taken in connection with the accompanying drawing in which the single figure is a schematic representation showing in cross section a fluid pressure brake control apparatus embodying the invention.

DESCRIPTION

Referring to the drawing, the improved fluid pressure brake control apparatus comprises the usual brake cylinder device 1 which will respond to the degree of build-up or reduction in pressure of fluid supplied thereto to effect a corresponding degree of braking of such as wheels on a railway vehicle through the medium of the usual brake shoes and rigging (not shown); an auxiliary or supply reservoir 2 for storing the fluid under pressure which is supplied to the brake cylinder device 1 during both service and emergency applications of the brakes on the vehicle; a supplemental or emergency reservoir 3 for storing fluid under pressure for supply to the brake cylinder device 1 together with that from the auxiliary reservoir 2 during an emergency application of the brakes; a control reservoir 4 for storing fluid at a datum pressure; the usual brake pipe 5 which is adapted to extend through a train for conveying fluid under pressure to and from the usual engineer's brake valve device (not shown) located on the locomotive of such train; a service control portion 6 which comprises means for effecting charging of the auxiliary and control reservoirs 2 and 4, for effecting local quick service withdrawal of fluid under pressure from the brake pipe, for effecting supply of fluid under pressure from the auxiliary reservoir 2 to the brake cylinder device 1 during service application of the brakes and graduated release of fluid under pressure from the brake cylinder device 1 following a service and an emergency application of the brakes, and for controlling inshot supply of fluid under pressure to the brake cylinder device; and an emergency control portion 7 which comprises means for controlling the charging of the emergency reservoir 3 from the brake pipe 5, for effecting local withdrawal of fluid under pressure from the brake pipe 5 at an emergency rate according to rate of initial reduction in brake pipe pressure, and for controlling supply of fluid under pressure from the emergency reservoir 3 to the brake cylinder device 1.

To provide for substantial charging and recharging of the auxiliary reservoir 2, the control portion 6 comprises an auxiliary reservoir charging check valve device 8 which includes a check valve 9 urged by a light bias spring 10 to permit only one-way flow between a fluid pressure inlet chamber 11 and an outlet chamber 12. The inlet chamber 11 is in constantly open communication with the brake pipe 5 by way of an auxiliary reservoir charging choke 13 and branches of a brake pipe passage 14, while the outlet chamber 12 is in constantly open communication with the auxiliary reservoir 2 by way of branches of an auxiliary reservoir passage 15 and pipe 16.

During initial charging and during recharging of the auxiliary reservoir 2, at any time that pressure of fluid in the brake pipe 5 exceeds pressure of fluid in the auxiliary reservoir 2 to a slight degree, such as one and seven-tenths pounds, sufficient to unseat the check valve 9 against opposition of the light bias spring 10, fluid under pressure will flow from the brake pipe to the auxiliary reservoir via passage 14, choke 13, chamber 11, the unseated valve 9, chamber 12, passage 15 and the pipe 16 to charge said auxiliary reservoir 2 to substantially that of the brake pipe.

For controlling charging and reservoir overcharge dissipating communications between the brake pipe and the auxiliary and control reservoirs 2 and 4, the control portion 6 is provided with a cut-off valve device 17 comprising a stem type slide valve 18 operably attached to a diaphragm 19 which is subject opposingly to pressure of fluid in a control chamber 20 on its one side and force of a compression spring 21 disposed in a non-pressure chamber 22 on its opposite side, the latter chamber being constantly open to the atmosphere by way of a port 23.

The slide valve 18 comprises axially spaced-apart annular grooves 24 and 25 for establishing fluid pressure communications between the brake pipe 5 and the control and auxiliary reservoirs 4 and 2, respectively.

The groove 24 is arranged to be in constantly open communication with the control reservoir 4 by way of a passage 26 and pipe 27 and, in the charging and overcharge dissipating position of the valve 18 in which it is shown in the drawings, such groove 24 is arranged to be open to the brake pipe 5 by way of a brake pipe passage 28, a control reservoir charging and overcharge dissipating choke 29, and a branch of the brake pipe passageway 14 connected without restriction to said brake pipe.

The groove 25 in slide valve 18 is arranged to be in constantly open communication with the auxiliary reservoir 2 by way of a branch of the passage 15 and the pipe 16 connected to said reservoir and, in the charging and overcharge dissipating position of said valve in which it is shown on the drawing, the groove 25 is arranged to be in fluid pressure communication with the brake pipe 5 by way of a brake pipe passage 30, an auxiliary reservoir final charge and overcharge dissipation choke 31, and the brake pipe passage 14.

The clearance volume 32 at the end of valve 18 is vented to the atmosphere by way of a port 33, to prevent any build-up in pressure in such volume which would interfere with valve movement.

In the charging valve device 17, the value of the spring 21 and the area of the diaphragm 19 are such that this device is responsive to a slight increase in pressure of fluid in its chamber 20 above atmospheric pressure, to the extent of about one pound, for example, to move the slide valve 18 to a cut-off position defined by engagement of said valve with a stop shoulder 34 defining one end of clearance volume 32. In such cut-off position of the slide valve 18, the grooves 24 and 25 will be disposed out of registry with the brake pipe passages 28 and 30 to disestablish communication thereby between the brake pipe and the control and auxiliary reservoirs 4 and 2, by way of passages 26 and 15, respectively.

For effecting quick service withdrawal of fluid under pressure locally from the brake pipe 5 on a particular car employing the apparatus, the control portion 6 is provided with a quick service valve device 35 which includes a stem type slide valve 36 operably connected to a diaphragm motor assemblage 37 to control fluid pressure communication between a brake pipe passage 38 and a quick service passageway 39; the brake pipe passageway 38 being in constantly open communication at its one end with the brake pipe passageway 14 by way of a quick service control choke 40, and at its opposite end with a clearance chamber 41 at one end of the slide valve 36, while the quick service passageway 39 is constantly open to a quick service volume chamber 42.

The slide valve 36 includes a central passage 43 which extends in an axialwise direction from the clearance chamber 41 into communication, via radial ports 44, with an annular groove 45 formed in the outer periphery of said valve.

The diaphragm motor assemblage 37 is subject opposingly on its opposite faces, respectively, to pressures of fluid in a brake pipe pressure chamber 46 and an auxiliary reservoir pressure chamber 47. A light compression spring 48, disposed in the brake pipe pressure chamber 46, cooperates with diaphragm motor assemblage 37 and attached slide valve 36 to urge same toward a repose position in which they are shown in the drawing, defined by engagement of a portion of said assemblage with a casing shoulder 49. An opposite quick service position of diaphragm motor assemblage 37 and slide valve 36 is defined by engagement of said slide valve with an end wall 50 of chamber 41.

For controlling continuation of quick service activity and pressurization of the control chamber 20 in the cut-off valve device 17, the control portion 6 includes an interlock device 51 which comprises a stem type slide valve 52 operably attached to a diaphragm 53 which is subject opposingly to pressure of fluid in a control chamber 54 on one side and to force of a compression spring 55 disposed in an non-pressure chamber 56 on its opposite side; the latter chamber being constantly open to the atmosphere by way of a vent port 57.

The slide valve 52 comprises an annular groove 58 for establishing communication between a branch of the quick service passage 39 and a passage 59 which is constantly open without restriction to the control chamber 20 in the cut-off valve device 17, and, via a choke 60, is also constantly open to the brake cylinder 1 via a passage 61 and other communicating means to be set forth hereinafter.

The chamber 54 in device 51 is constantly connected to a branch of the brake cylinder passage 61 and the value of the spring 55 relative to the area of the diaphragm 53 is such that the slide valve 52 will be held disposed in the position in which it is shown in the drawing so long as brake cylinder pressure in the chamber 54 is below a certain value such as ten pounds, for example, and the slide valve 52 will be actuated to a quick service cut-off position, defined by engagement of a valve-attached diaphragm follower member 62 with a casing shoulder 63, when brake cylinder pressure in chamber 54 increases above said certain value. In the quick service cut-off position of valve 52, a groove 58 therein is out of registry with passage 39 to disestablish communication between said passage 39 and the passage 59, for reasons which will hereinafter become apparent.

Clearance volume 64 at the end of slide valve 52 in the device 51 is vented to the atmosphere by way of port 65.

For controlling supply of fluid under pressure from the auxiliary or supply reservoir 2 to the brake cylinder 1, the control portion 6 includes a service valve device 66 which comprises a brake cylinder supply and release valve 67, an actuating stem 68 having a release valve seat element 69 formed therein for cooperation with valve 67, and diaphragm motor assemblages 70 and 71 operably associated with the stem 68.

The supply and release valve 67 is disposed in a supply chamber 72 which is constantly open to the auxiliary reservoir 2 by way of the auxiliary reservoir passage 15. The valve 67 is cooperable with a valve seat 73 to control communication between the supply chamber 72 and the brake cylinder passage 61 via a port 74 encircled by valve seat 73 at the end of a bore 75 which continues from such port and in which the actuating stem 68 is disposed in slidably guided sealed cooperation with the wall thereof. A light compression spring 76, disposed in chamber 72, is arranged to bias the valve 67 toward the seat 73.

The end of the actuating stem 68 in which the release valve seat element 69 is formed, is reduced in cross section to provide an annular clearance passage 77 between the wall of the port 74 and of the bore 75 to afford a path for flow of fluid under pressure from chamber 72 into brake cylinder passage 61 when valve 67 is held unseated against opposition of the spring 76 by engagement with the seat element 69. A brake cylinder release passage 78 is formed in stem 68 which opens through its projecting end in encirclement by seat element 69 and extends therefrom in an axial direction into intersection with a plurality or radial ports 79 opening into a groove 80 formed in the outer periphery of said stem. The groove 80 is arranged in stem 68 to be opened to an exhaust passage 81 at least when seat element 69 is disposed away from the valve 67; exhaust passage 81 being open at one end through the wall of the bore 75 and at its opposite end to the atmosphere.

The diaphragm motor assemblage 70 is operably attached to the stem 68 directly and is subject opposingly on its opposite faces to pressure of fluid in a brake cylinder pressure chamber 82 into which said stem extends; and to atmospheric pressure in a non-pressure chamber 83.

The brake cylinder pressure chamber 82 is constantly open to a branch of the brake cylinder passage 61 by way of a passage 84 and a stabilizing choke 85; and the non-pressure chamber 83 is constantly open to the atmosphere by way of a port 86.

The diaphragm motor assemblage 71 is subject opposingly on its opposite faces, respectively, to pressure of fluid in a brake pipe pressure chamber 87 constantly open to the brake pipe passage 14, and to pressure of fluid in a control reservoir pressure chamber 88, which is constantly open to the control reservoir passage 26. A partition 89 separates the brake pipe pressure chamber 87 from the non-pressure chamber 83; and a stem 90, extending slidably through an opening 91 in said partition, is arranged to serve as the medium through which the diaphragm motor assemblage 71 cooperates with the diaphragm motor assemblage 70 to operate the stem 68.

A light compression spring 92, disposed in a brake cylinder pressure chamber 82, is arranged to cooperate with the motor assemblage 70 to act on the diaphragm motor stack in opposition to pressure of fluid in the control reservoir pressure chamber 88 and in assist to pressures of fluid in said brake cylinder pressure chamber and in the brake pipe pressure chamber 87.

For controlling inshot of fluid under pressure to the brake cylinder 1 to assure rapid gathering of slack in the brake rigging (not shown) for advancement of the brake shoe (not shown) into engagement with the wheel (not shown) of the vehicle employing the subject brake apparatus, the control portion 6 of such apparatus is provided with the usual inshot valve device 93 which comprises a poppet type valve 94 operably connected to a diaphragm motor assemblage 95 through the medium of stem 96.

The valve 94 is suitably guided for cooperation with a valve seat 97 to control communication between a chamber 98 constantly open to the brake cylinder passage 61 and a chamber 99, which is constantly open to the brake cylinder 1 via a brake cylinder passage 100 and a pipe 101. The valve 94 is lightly biased toward its seat 97 by a compression spring 102 disposed in the chamber 98.

The diaphragm motor assemblage 95 is subject opposingly on its opposite faces, respectively, to pressure of fluid in a control chamber 103, constantly open to the brake cylinder passage 100 via a stabilizing choke 104, and to force of compression spring 105 disposed in a non-pressure chamber 106, which is constantly open to the atmosphere by way of a port 107.

The stem 96 extends slidably through an opening 108 in a removable element 109 in which seat 97 is formed, and abuts the valve 94 at its one end and is attached at its opposite end to the diaphragm motor assemblage 95.

The force of the spring 105 is such that when the brake cylinder pressure in control chamber 103 is less than a certain value such as ten pounds, for example, the valve 94 will be held open in opposition to the light bias spring 102, and when brake cylinder pressure in chamber 103 exceeds such certain value, the stem 96 will be retracted to permit spring 102 to seat the valve 94.

An application control choke 110 is interposed between the brake cylinder passage 61 and the brake cylinder passage 100 in by-pass of the inshot valve device 93.

DESCRIPTION OF EMERGENCY CONTROL PORTION OF THE BRAKE APPARATUS

To provide for charging of the emergency reservoir 3, the emergency control portion 7 comprises an emergency reservoir charging check valve device 111 having a check valve 112 arranged to permit flow of fluid under pressure from an inlet chamber 113 to an outlet chamber 114 and to prevent flow of fluid under pressure in the reverse direction. The check valve 112 is urged by a light bias spring 115 toward its seated position in which it is shown in the drawing. The inlet chamber 113 of the check valve device 111 is constantly open to a branch of the brake pipe passage 14 by way of an emergency reservoir charging choke 116, while the outlet chamber 114 is constantly open to the emergency reservoir 3 by way of a passage 117 and a pipe 118.

For effecting rapid local venting of fluid under pressure from the brake pipe on the car employing the subject brake apparatus and thereby effecting operation of a high pressure valve device 154, the emergency control portion 7 comprises a vent valve device 119 which includes a poppet type valve 120 cooperable with a seat 121 to control communication between a brake pipe chamber 122, constantly open to a branch of brake pipe passage 14, and an exhaust chamber 123 which is constantly open to the atmosphere by way of a passage 124; and a diaphragm motor assemblage 125 for actuating the valve 120 through the medium of stems 126 and 127.

The poppet type valve 120 in the vent valve device 119 is urged toward its seat by a light compression spring 128 through the medium of a spring follower element 129 slidably guided by the walls of a suitable bore in which said element 129 is disposed. Spring follower element 129 comprises a sleeve portion 130 disposed in the chamber 122 in encirclement of the valve 120 to retain same radialwise for proper alignment with the seat 121. Contact between the follower element 129 and the valve 120 transpires by way of a rounded element 131 which projects centrally into the sleeve element 130 and permits sufficient freedom of rocking movement of valve 120 to assure its proper seating contact with the seat 121.

The diaphragm motor assemblage 125 is subject opposingly on its opposite faces to pressure of fluid in a brake pipe pressure chamber 132, constantly open to the brake pipe passage 14, and to pressure of fluid in a quick action chamber 133 which is constantly open to the brake pipe passage 14 by way of a passage 134 and a choke 135. Diaphragm motor assemblage 125 is guided for reciprocal movement toward and away from the valve 120 through the medium of a stem 136 attached to said motor assemblage and slidably guided by the inner wall of a sleeve element 137 attached to the casing.

According to a novel feature of the vent valve device 119, a diaphragm follower member 138 of the diaphragm motor assemblage 125 in exposure to the chamber 133 is provided with an annular rib 139 at its outer periphery which projects in the direction of said chamber for cooperation with an annular resilient seat element 140 disposed in the path of travel of the said rib to control an additional communication between the quick action chamber 133 and the brake pipe passage 14 by way of a passage 141 and a choke 142, for reasons which will hereinafter be made apparent.

A yieldable stop element 143 is disposed in the path of travel of the diaphragm motor assemblage 125 when moving in the direction of chamber 132. The yieldable stop element 143 is in the form of a sleeve having an annular flange 144 at one end which is engaged by a compression spring 145 to urge said stop element 143 to a repose position defined by engagement of said annular flange 144 with an annular fixed stop shoulder 146 formed in the casing. The spring 145 is disposed in a cavity 147 formed in the casing and separated from the exhaust chamber 123 by a partition 148. One end of the stem 127 is attached to the diaphragm motor assemblage 125 and extends into the cavity 147 into abutment at its opposite end with a respective end of the stem 126 which extends therefrom slidably through a central opening 149 in the partition 148 and into the exhaust chamber 123 for abutment with the valve 120.

A caged spring assemblage, including a compression spring 150, a washer element 151, and a lock ring 152, is provided to afford yieldable opposition to movement of the diaphragm motor assemblage 125 in the direction of the quick action chamber 133. The spring 150 encircles the stem 136 and abuts the diaphragm follower member 138 on one end and the annular washer element 151 at its opposite end, which also encircles said stem. Washer element 151 is retained on the stem 136 by the stop ring 152 which is removably disposed in a suitable annular groove formed in said stem. An annular groove 153 formed in the appropriate end of the sleeve element 137 permits axialwise movement of the stem 136 and stop ring 152 in the direction of chamber 133 a distance at least as great as that between annular rib 139 on diaphragm follower member 138 and the annular resilient sealing element 140.

For directly controlling admission of fluid under pressure from the emergency reservoir 3 to the brake cylinder 1, the emergency control portion 7 is provided with the high pressure valve device 154 which comprises a piston valve 155 subject opposingly to pressure of fluid in a brake pipe pressure chamber 156, constantly open to the brake pipe passage 14, and to force of a compression spring 157 disposed in a non-pressure chamber 158, which is constantly open to the atmosphere by way of a passage 159. Piston valve 155 is provided with an annular groove 160 formed in its outer periphery for registry with a branch of the emergency reservoir passage 117 and with a passage 161 which is constantly open to the brake cylinder 1 by way of the pipe 101, the passage 100, and an emergency application control choke 162.

The groove 160 in the piston valve 155 of the high pressure valve device 154 is arranged so that it will be in registry with passages 161 and 117 when said piston valve is in the position in which it is shown in the drawing defined by engagement with a stop element 163 formed in the casing. When pressure of fluid in the brake pipe pressure chamber 156 sufficiently preponderates over the force of spring 157, the piston valve 155 will be moved to an opposite position defined by engagement of said piston valve with a casing wall 164 and in which position the groove 160 is out of registry with the emergency reservoir passage 117 to disestablish its communication with the passage 161.

OPERATION

*Initial charging of the brake apparatus*

Assume initially that all the passages and chambers in the brake apparatus shown on the drawing are devoid of fluid under pressure; that the various parts of the apparatus are in the respective positions in which they are shown in the drawing; and, that it is desired to initially charge such apparatus. Via the engineer's brake valve on the locomotive, fluid under pressure will then be supplied to the brake pipe 5 and such fluid under pressure will flow therefrom into the passage 14 in the brake control apparatus on each car of the train. In each respective apparatus on any particular car of the train, fluid under pressure will flow from the passage 14 to the auxiliary reservoir 2 by way of the choke 13, the inlet chamber 11 of check valve device 8, the unseated check valve 9 and the outlet chamber 12 therein, the passage 15, and the pipe 16. Fluid under pressure thus supplied to the passage 14 will also flow to the emergency reservoir 3 by way of the emergency reservoir charging choke 116, the inlet chamber 113 of the emergency reservoir charging check valve device 111, the unseated check valve 112 and outlet chamber 114 therein, the passage 117, and the pipe 118; as well as to the control reservoir 4 by way of respective branches of passages 14 in the control portion 6, the control reservoir charging and overcharging dissipating choke 29, the passage 28, the groove 24 in slide valve 18 of the cut-off valve device 17, the passage 26, and the pipe 27. At the same time, fluid under pressure supplied to the brake pipe passage 14 in the service control portion 6 of the brake apparatus will flow also to the chamber 87 in the service valve device 66, and to the chamber 46 in the quick service valve device 35. In the emergency control portion 7, fluid under pressure supplied to the brake pipe passage 14 therein will flow to the chamber 132 in the vent valve device 119, and from said chamber 132, such fluid under pressure will flow into the quick action chamber 133 by way of the chokes 135 and 142 and associated passages 134 and 141, respectively. Also at the same time, fluid under pressure supplied to the auxiliary reservoir 2 by way of the passage 15 in the service control portion 6 of the brake control apparatus will flow to the auxiliary reservoir pressure chamber 47 in the quick service valve device 35 and to the supply chamber 72 in the service valve device 66, and fluid under pressure supplied to the control reservoir 4 by way of the passage 26 will flow to the control reservoir pressure chamber 88 in said service valve device 66. After the lapse of the period of time necessary to effect the charging of the reservoirs 2, 3 and 4 and quick action chamber 133 in vent valve device 119, the pressure of fluid in the brake pipe 5 will be stabilized at a normal value such as seventy pounds preparatory to operation of the brake apparatus when necessary.

During such initial charging of the brake control apparatus, the brake cylinder device 1 will remain devoid of fluid under pressure while the service valve device 66 remains in its release position in which it is shown in the drawing, as pressure of fluid in its brake pipe pressure chamber 87 is increased at a greater rate than in its control reservoir pressure chamber 88 due to the restriction imposed by choke 29 to charging flow to the control reservoir; the quick service valve device 35 will remain in its repose position while pressure of fluid in brake pipe pressure chamber 46 is increased at a greater rate than pressure of fluid in the auxiliary reservoir pressure chamber 47, due to the restriction imposed by the choke 13 on charging flow to the auxiliary reservoir by way of the charging check valve device 8 as well as restriction imposed by the choke 31 to any charging flow to the auxiliary reservoir which may transpire by way of the passage 30, the groove 25 in the slide valve 18 of the cut-off valve device 17, the passage 15 and the pipe 16; the interlock valve device 51 will remain in the position in which it is shown in the drawing in absence of any brake cylinder pressure in its chamber 54; the cut-off valve device 17 will remain in the position in which it is shown in the drawing, with its control chamber 20 devoid of fluid under pressure by virtue of its connection to atmosphere via passage 61, and chamber 77, passage 78, ports 79, groove 80, and the passage 81 in the service valve device 66 in its release posiiton; and inshot valve device 93 will remain in the position in which it is shown in the drawing by virtue of its chamber 103 being devoid of any brake cylinder pressure. In the emergency control portion 7, during initial charging of the brake apparatus, the valve 120 in the vent valve device 119 will remain seated in absence of any preponderant effect of pressure of fluid in the quick action chamber 133 over brake pipe pressure in chamber 132, while the diaphragm motor assemblage 125 will remain substantially in its neutral position, in which it is shown in the drawing, by virtue of the cooperative effect of the caged spring 150 and yieldable stop 144 thereon; the piston valve 155 in the high pressure valve device 154 will be caused to shift against opposition of the spring 157 to its cut-off position defined by engagement with the wall 164 to disestablish communication between passages 161 and 117 when brake pipe pressure in chamber 156 goes above such as twenty-six pounds.

*Service application of the brakes*

In effecting a service application of the brakes, initiation of such application will be effected by manipulation of the engineer's brake valve on the locomotive to reduce pressure of fluid in the brake pipe 5 at a service rate. In the respective brake control apparatus on the first car or the first several cars of the train, such reduction in brake pipe pressure will be experienced in the brake pipe pressure chamber 46 in the quick service valve device 35 by way of the brake pipe passage 14, while any considerable reduction in auxilary reservoir pressure resultant from flow of fluid under pressure from the auxilary reservoir 2 to the brake pipe 5 by way of the pipe 16, passage 15, groove 25 in slide valve 18 of cut-off valve device 17, and passage 30, is prevented by the restrictive effect of the choke 31 connecting said passage 30 to the brake pipe 5 via the passage 14. Such service reduction in brake pipe pressure in the brake pipe pressure chamber 46 in the quick service valve device 35 relative to the slight reduction in auxiliary reservoir pressure in the chamber 47 therein will cause the auxiliary reservoir pressure to preponderate over brake pipe pressure to the extent of such as seven-tenths of a pound, necessary to actuate the diaphragm motor assemblage 37 to move the slide valve 36 to quick service position in which it contacts the end wall 50. In quick service position of the slide valve 36, fluid under pressure will flow locally from the brake pipe 5 on the particular car or cars in which the quick service valve device 35 has thus responded as above, to the quick service volume chamber 42 and to the atmosphere, by way of the brake pipe passage 14, the quick service control choke 40, the passage 38, passage 43 in the slide valve 36 which will be in registry with said passage 38, ports 44 and the groove 45 in said slide valve, the passage 39 connected to the volume chamber 42 directly, and to the atmosphere by way of said passage 39, the groove 58 in the slide valve 52 of the interlock device 51, passage 59, the quick service continuation control choke 60, the brake cylinder passage 61, the annular passage 77 in the service valve device 66, the passage 78, port 79 and groove 80 in the stem 68 of said service valve device, and the passage 81. At the same time, such fluid under pressure withdrawn from the brake pipe by way of the quick service valve device 35 and supplied to the passage 59 will flow to the control chamber 20 in the cut-off valve device 17 and cause same to assume its cut-off position defined by engagement of the slide valve 18 with the end wall 34 to disestablish registry of grooves 24 and 25 with the brake pipe passages 28 and 30, respectively, thereby disestablishing communication between the control and auxiliary reservoirs 4 and 2 and the brake pipe via such brake pipe passages, respectively.

Such quick service withdrawal of fluid under pressure locally from the brake pipe 5 to the quick service bulb 42 by way of the quick service valve device 35 on the first car or on the first several cars of the train will cause a sufficient reduction in brake pipe pressure on the immediately succeeding car or cars which will operate the respective quick service valve devices thereon to rapidly propagate such quick service reduction in brake pipe pressure back through the train from car to car. On each car, by virtue of the size of the quick service volume chamber 42 relative to the volume of the brake pipe 5 on such car, the reduction in brake pipe pressure resultant from the filling of said quick service volume chamber will amount to such as four or five pounds, which reduction, as realized in the brake pipe pressure chamber 87 in the service valve device 66, will cause control reservoir pressure in chamber 88 acting on the diaphragm motor assemblage 71 to preponderate over brake pipe pressure in chamber 87 sufficiently to effect unseating of the brake cylinder supply valve 67 by movement of the stem 90, the diaphragm motor assemblage 70, and the stem 68 by abutment of seat element 69 with the said valve 67. By unseating of valve 67, fluid under pressure from the auxiliary reservoir 2 is permitted to flow to the brake cylinder device 1 by way of the pipe 16, the auxiliary reservoir passage 15, the supply chamber 72 in the service valve device 66, the unseated supply valve 67, the port 74, the passage 77, passage 61, chambers 98 and 99 and the unseated valve 94 in the brake cylinder inshot valve device 23, the passage 100, and the pipe 101, in by-pass of the application control choke 110, through which some slight flow of fluid under pressure to passage 100 may transpire from said passage 61. Seating engagement of the seat element 69 in the service valve device 66 with the valve 67 will prevent fluid under pressure thus supplied to the brake cylinder 1 via the port 74 and the passage 77 from escaping to the atmosphere air passage 78 in said seat element.

At the same time, fluid under pressure withdrawn from the brake pipe by way of the respective quick service valve device 35 will continue to flow via the passage 39, the groove 58 in the slide valve 52 of the interlock valve device 51, the passage 59, the choke 60, the passage 61, etc., as previously traced, to the brake cylinder 1, and such reduction in brake pipe pressure, together with that which may transpire as a result of continued reduction at the brake valve on the locomotive, will continue until pressure of fluid in the brake cylinder 1, being increased by supply of fluid under pressure thereto from the auxilary reservoir 2 via the service valve device 66 as above described, attains a value of such as ten pounds. Upon attainment of ten pounds brake cylinder pressure, such pressure as experienced in the control chamber 54 of the interlock valve device 51 via the brake cylinder passage 61, will operate the diaphragm 53 to actuate the slide valve 52 to its quick service cut-off position defined by engagement of the follower member 62 with the annular shoulder 63 and disestablish communication between the passage 39 and the passage 59 to terminate any further withdrawal of fluid under pressure from the brake pipe thereby. At the same time, such brake cylinder pressure as experienced in the brake cylinder pressure chamber 103 in the inshot valve device 93 via the choke 104, passage 100 and the pipe 101, will cause the diaphragm motor assemblage 95 to operate against oppositon of the control spring 105 and actuate the stem 96 in the direction away from the valve 94 and thereby permit the spring 102 to seat said valve 94 on its seat 97 and close off the passage 61 to the passage 100 via the chambers 98 and 99.

Subsequent to closure of the valve 94 in the brake cylinder inshot valve device 93, continued supply of fluid under pressure from the auxiliary reservoir 2 to the brake cylinder device 1 via the service valve device 66 and the passage 61 will flow through the application control choke 110, the pipe 101 and passage 100.

When the pressure of fluid in the brake pipe 5 becomes stabilized at a value determined by the engineer on the locomotive through manipulation of the usual brake valve on such locomotive, supply of fluid under pressure from the auxiliary reservoir 2 to the brake cylinder 1 on a particular car will be terminated when brake cylinder pressure as realized by the brake cylinder pressure chamber 82 in the service valve device 66 reaches a value commensurate with the reduced brake pipe pressure in chamber 87 of such service valve device. Such brake cylinder pressure in chamber 82, in acting on the diaphragm motor assemblage 70 in assist to brake pipe pressure in chamber 87 acting on the diaphragm motor assemblage 71, will actuate the stem 68 in opposition to control reservoir pressure in chamber 88 to permit the spring 76 to actuate the supply and release valve 67 into engagement with its seat 73 while remaining in engagement with the seat element 69, thereby lapping off the brake cylinder passage 61 from the supply chamber 72 as well as from the release passage 78 in said seat element 69, to hold the desired pressure of fluid in passage 61 and hence in the brake cylinder device 1.

From the foregoing, it will be apparent that any particular degree of brake cylinder pressure may be attained by operation of the service valve device 66 according to the degree of reduction in brake pipe pressure relative to control reservoir pressure, either initially or in subsequent graduated steps, up to a maximum brake cylinder pressure of such as fifty pounds as determined by equalization of the pressure in the auxiliary reservoir 2 with that in the brake cylinder 1 and corresponding to reduction in brake pipe pressure to or below a maximum service value of such as fifty pounds.

During the effecting of a service application of the brakes in response to reduction in brake pipe pressure as above described, including the period in which quick service withdrawal of fluid under pressure from said brake pipe via the respective quick service valve device 35 transpires, pressure of fluid in the quick action chamber 133 in the vent valve device 119 in the emergency control portion 7 will equalize with pressure of fluid in the brake pipe 5 by way of passages 134, 141 and chokes 135, 142, respectively, the chamber 132, and the passage 14 at such a rate that differential in pressures built up across the diaphragm motor assemblage 125 in said device 119 in opposition to the yieldable stop member 143 and the force of spring 128 will not be sufficient to effect unseating of the poppet type valve 120, and no venting of the brake pipe 5 locally to the atmosphere by way of the vent valve device 119 will occur. So long as the brake pipe pressure is maintained at a value equal to or greater than that calling for full service application of the brakes in which the auxiliary reservoir pressure equalizes with that in the brake cylinder device 1 as previously mentioned, such brake pipe pressure as experienced in the chamber 156 of the high pressure valve device 154 in said emergency control portion 7 will be sufficient to maintain the piston valve 155 in said device 154 in its cut-off position, and thus will maintain the emergency reservoir 3 cut off from the brake cylinder device 1.

*Emergency application of the brakes*

An emergency application of the brakes, or, in other words, supply of fluid under pressure from the emergency reservoir 3 to the brake cylinder device 1, may occur as a result of a service rate of reduction in brake pipe pressure a certain degree below its full service value of such as fifty pounds, whereupon, such reduction in brake pipe pressure as experienced in the brake pipe pressure chamber 156 in the high pressure valve device 154 will permit the spring 157 to actuate the piston valve 155 to its emergency application position defined by engagement with the stop element 163. The groove 160 in said piston valve is thereby brought into registry with passage 117 and 161 to permit fluid under pressure from the emergency reservoir 3 to flow to the brake cylinder device 1 by way of the pipe 118, said passage 117, said groove 160, said passage 161, the emergency application control choke 162, the passage 100 and the pipe 101. Under such circumstances pressure of fluid in the emergency reservoir 3 will equalize with that in the brake cylinder device 1 previously charged at its full service value of such as fifty pounds, to attain a higher brake cylinder pressure of such as sixty pounds.

To initiate an emergency application of the brakes for supply of fluid under pressure from the emergency reservoir 3 to the brake cylinder device 1 concurrently with supply of fluid under pressure from the auxiliary reservoir 2 to said brake cylinder device 1, the pressure of fluid in the brake pipe 5 will be reduced via the usual engineer's brake valve device on the locomotive at an emergency rate. Such reduction in brake pipe pressure at an emergency rate, in addition to causing operation of the quick service valve device 35, service valve device 66, cut-off valve device 17, and interlock valve device 51, will be experienced, via passage 14, in the brake pipe pressure chamber 132 in the vent valve device 119 and cause the pressure of fluid in the quick action chamber 133, isolated from chamber 132 by chokes 135 and 142, to preponderate over such rapidly reducing brake pipe pressure in chamber 132 sufficiently to cause the diaphragm assemblage 125 to overcome the opposition of the yieldable stop element 143 and spring 128 and, through the medium of stems 126 and 127, to unseat the poppet valve 120. Upon the unseating of valve 120, fluid under pressure from the brake pipe 5 will be released to the atmosphere substantially without restriction via the passage 14, said unseated valve 120, chambers 122 and 123, and the passage 124. Thus pressure of fluid in the brake pipe 5 will continue to reduce at an emergency rate locally by way of the respective vent valve device 119 on a particular car, and this reduction in brake pipe pressure at an emergency rate will be propagated through the brake pipe 5 from car to car by the respective vent valve devices 119 on the succeeding cars. On any particular car, the brake pipe pressure will thus be quickly reduced to some value less than such as twenty-six pounds to permit the spring 157 in the high pressure valve device 154 to actuate piston valve 155 to its emergency position defined by its engagement with stop element 163 and thereby establish communication between the passages 117 and 161 via the groove 160 to permit supply of fluid under pressure from the emergency reservoir 3 to the brake cylinder device 1 by way of pipe 118, said passage 117, said groove 160, said passage 161, the emergency application control choke 162, the passage 100, and the pipe 101. Pressure of fluid in the brake pipe 5 will rapidly reduce to the atmosphere as fluid under pressure in the emergency reservoir 3, the auxiliary reservoir 2, and the brake cylinder device 1 equalize at such sixty pounds, with the high pressure valve 155 in its application position, and the service valve device 66 remaining in its application position with its valve 67 held disposed away from the seat 73 by the stem 68, in absence of any brake pipe pressure in the chamber 87.

During the existence of such emergency application of the brakes, the quick service valve device 35 will remain in its quick service position under influence of ponderance of auxiliary reservoir pressure in its chamber 47 over pressure of fluid in its brake pipe pressure chamber 46, which, under the circumstances, is devoid of any pressure of fluid; service valve device 66 will remain in its application position under the influence of the preponderant effect of pressure of fluid in its control reservoir pressure chamber 88 over pressure of fluid in the brake cylinder pressure chamber 82 in absence of any pressure in its brake pipe pressure chamber 87; the cut-off valve device 17 will remain in its cut-off position under influence of brake cylinder pressure in its chamber 20; the interlock valve device 51 will remain in its quick service cut-off position under influence of brake cylinder pressure in the chamber 54; the inshot device 93 will remain in its inshot cut-off position in which its valve 94 is in engagement with the seat 97 by virtue of brake cylinder pressure in its chamber 103; the high pressure valve device 154 will remain in its emergency application position by virtue of the preponderant effect of the spring 157 over the atmospheric pressure in its brake pipe pressure chamber 156; while the diaphragm motor assemblage 125 in the vent valve device 119 will be returned by the spring 145 to its neutral position in which it is shown in the drawing and thereby permit the spring 128 to reseat the vent valve 120 upon substantial equalization of pressure of fluid in the quick action chamber 133, via chokes 135 and 142, with the atmospheric pressure within the brake pipe pressure chamber 132.

*Release of the brakes*

Following either a service or an emergency application of the brakes, brake pipe pressure will be restored to its normal value of such as seventy pounds by supply of fluid under pressure thereto from the brake valve on the locomotive and such fluid under pressure will flow to the respective brake control apparatus on each car of the train. In each respective apparatus, such fluid under pressure will flow from the brake pipe 5 by way of the passage 14 to the brake pipe pressure chamber 87 of the service valve device 66 in the service control portion 6. When such brake pipe pressure in chamber 87, acting on the diaphragm motor assemblage 71 in assist to brake cylinder pressure in chamber 82 acting on the diaphragm motor assemblage 70, is thus increased sufficiently to overcome opposition of the control reservoir pressure in chamber 88, the diaphragm motor assemblages 70 and 71, interconnected by way of the stem 90, will actuate the stem 68 in the direction of said control reservoir pressure chamber 88 and cause the valve seat element 69 to leave the valve 67 which will then become seated under the influence of the spring 76 to close off the supply chamber 72 from the port 74. Actuation of the valve seat element 69 away from the valve 67 will permit release of fluid under pressure from the brake cylinder device 1 to the atmosphere by way of the pipe 101, the passage 100, the choke 110, the passage 61, the passage 77 in the service valve device 66, the port 74 therein, the passage 78, ports 79, and the groove 80 in the stem 68 of said device, and the passage 81 open to the atmosphere. When the brake cylinder pressure as reduced by release of fluid under pressure from brake cylinder device 1 by the service valve device 66 as above described attains a value less than such ten pounds, such brake cylinder pressure as experienced in the control chamber 54 in the interlock valve device 51 will permit the spring 55 to return the slide valve 52 to its uppermost position in which it is shown in the drawing. In such position of the slide valve 52, communication between the passages 39 and 59 is reestablished via groove 58 and fluid under pressure from the quick service volume chamber 42, connected to passage 39, and from the control chamber 20 in the cut-off valve device 17, connected to passage 59, will flow thereby to the atmosphere at a controlled rate by way of said passage 59, the choke 60, the brake cylinder passage 61, the service valve device 66 in its release position, and the passage 81. When pressure of fluid in the control chamber 20 of the cut-off valve device 17 being reduced by virtue of such release of fluid under pressure therefrom attains a value within a slight degree of atmospheric pressure, the spring 21 will cause the slide valve 18 to be actuated to the position in which it is shown in the drawing wherein communication between the brake pipe passages 28 and 30 with the control and auxiliary reservoir passages 26 and 15, respectively, is reestablished via grooves 24 and 25, respectively. At this time, the pressure of fluid in the brake pipe 5 will be substantially equal to its normal full charge value of such as seventy pounds, so that the return of the charging valve device 17 to its charging position will permit fluid under pressure from said brake pipe to flow to the control and auxiliary reservoirs 4 and 2, respectively, to make up for any deficiency in pressure of fluid which may exist therein, via respective flow paths as previously traced in connection with description of initial charging of the apparatus, it being appreciated that the auxiliary reservoir will have been charged to within such as one and seven-tenths pounds of brake pipe pressure by way of the charging check valve device 8 at the time that the cut-off valve device 17 returns to its charging position.

At the same time, when brake cylinder pressure as experienced in the chamber 103 in the inshot valve device 93 reduces to a value less than such as ten pounds, the spring 105, through the medium of the diaphragm motor assemblage 95, will actuate the stem 96 to unseat the spring biased poppet valve 94 and thereby permit release of fluid under pressure from the brake cylinder device 1 to the exhaust passage 81 to transpire by way of the pipe 101, passage 100, chambers 98 and 99 in said inshot valve device, the passage 61 and the service valve device 66, in by-pass of the choke 110. Considering the case where release of fluid under pressure from the brake cylinder device 1 follows an emergency application of the brakes, then when brake pipe pressure is increased to a value above such as twenty-six pounds, for example, such increased brake pipe pressure as experienced in the chamber 156 in the high pressure valve device 154 will actuate the piston valve 155 against opposition of the spring 157 to its cut-off position in engagement with the end wall 164 to disestablish communication between passages 117 and 161 via the groove 160 and thereby disestablish communication between the emergency reservoir 3 and the brake cylinder device 1. Such cut-off of communication between the emergency reservoir 3 and the brake cylinder device 1 by operation of the piston valve 155 in the high pressure valve device 154 will occur prior to actuation of the service valve device 66 to its release position to prevent the fluid under pressure retained in the emergency reservoir 3 from being vented to the atmosphere along with that in the brake cylinder device 1. Subsequently, when brake pipe pressure is increased to a value above pressure of fluid retained in the emergency reservoir 3, such as above sixty pounds, fluid under pressure will flow from the brake pipe 5 via passage 14 to the emergency reservoir 3 by way of the passage 14, the emergency reservoir charging control choke 116, chambers 113 and 114 in the emergency reservoir charging check valve device 111, the passage 117, and the pipe 118, after having unseated check valve 112 in said check valve device 111.

In the vent valve device 119 in the emergency control portion 7, following either an emergency or a service application of the brakes, fluid under pressure from the brake pipe 5 will flow to the quick action chamber 133 by way of the passage 14, the chamber 132 in said device 119, the chokes 135, 142, and the passages 134 and 141, respectively. If, however, pressure of fluid in the brake pipe 5 is built up at an excessive rate, such as by employment of full release position of the brake valve on the locomotive in which main reservoir pressure is supplied to the brake pipe for fast recharging of the brake equipments throughout the train, a preponderance of pressure may be established in the chamber 132 over pressure of fluid in chamber 133 which will be sufficient to cause the diaphragm motor assemblage 125 to move in the direction of said chamber 133 against opposition of the pressure in chamber 133 and the force of spring 150, to cause the annular rib 139 associated with said assemblage to seat on the sealing element 140 and isolate said chamber 133 from the chamber 132 via passage 141 and the choke 142 and thus discourage overcharging of said quick action chamber. Subsequent reestablishment of a normal rate of increase in brake pipe pressure as experienced in the chamber 132 in the vent valve device 119 will permit the force of the spring 150 and of pressure of fluid in the quick action chamber 133 to return the diaphragm motor assemblage 125 to its normal position in abutment with the yieldable stop element 143, whereupon any slight overcharge which may exist in said chamber 133 may be dissipated to the brake pipe by way of said chamber 132, the chokes 135, 142, and the passages 134 and 141, respectively.

Partial release of the brakes following either a service or an emergency application may be effected in the well-known manner by limiting the degree of restoration in the brake pipe pressure to something less than its normal full-charge value, in which case the service valve device 66 will respond to assume its lap position to hold the given brake cylinder pressure in the brake cylinder device 1 upon reduction in brake cylinder pressure as experienced in the chamber 82 to a value commensurate with the brake pipe pressure established in its chamber 87; said lap position being defined by the position of stem 68 wherein valve 67 is in engagement with its seat 73 and with the valve seat element 69 attached to said stem 68 whereby the brake cylinder passage 61 is neither open to the supply chamber 72 nor to the exhaust passage 78.

During release of the brakes responsively to restoration of brake pipe pressure, brake pipe pressure in chamber 46 in the quick service valve device 35 will become increased above auxiliary reservoir pressure, and during such time the spring 48 will be permitted to actuate the slide valve 36, through the medium of diaphragm motor assemblage 37, to the position in which it is shown in the drawing, in preparation for quick service activity during initiation of a subsequent reapplication of the brakes in manner as previously described herein.

Having now described the invention, what I claim as new and desire to secure by Letters Patent, is:

In a fluid pressure brake apparatus of the type comprising a normally charged brake pipe, a control reservoir containing fluid at substantially the normal charge value of brake pipe pressure, a normally charged auxiliary reservoir, a normally charged emergency reservoir, and a normally vented brake cylinder, the combination of valve means controlled by control reservoir pressure opposing brake pipe pressure and brake cylinder pressure and responsive to reductions and restorations in brake pipe pressure, irrespective of rate and within a range between the normal charge value of brake pipe pressure and a reduced value of brake pipe pressure corresponding to a full service reduction in brake pipe pressure, for providing in the brake cylinder fluid at a pressure proportionate to the magnitude of the differential between control reservoir pressure and brake pipe pressure, said valve means being responsive to a reduction in brake pipe pressure, irrespective of rate, to any value below said range to cause auxiliary reservoir pressure to equalize into the brake cylinder; other valve means normally cutting off the emergency reservoir from the brake cylinder and responsive to a reduction in brake pipe pressure, irrespective of rate, to below a preselected value that is below said range to connect the emergency reservoir to the brake cylinder; a vent valve normally biased to a position for disestablishing a large capacity flow connection from the brake pipe to atmosphere, and movable abutment means subject opposingly to brake pipe pressure and to pressure of fluid in a chamber having constant restricted connection with the brake pipe, and responsive only to an emergency rate of reduction in brake pipe pressure, which emergency rate exceeds the rate of backflow of fluid through said restricted connection, to shift said vent valve to a position for establishing said large capacity flow connection for thereby rapidly locally venting the brake pipe and thus causing fluid under pressure in the emergency reservoir and in the auxiliary reservoir to concurrently equalize into the brake cylinder, whereby brake cylinder pressure will rise rapidly and to a higher value than would be obtained solely by operation of the first-mentioned valve means.

References Cited in the file of this patent

UNITED STATES PATENTS

| | | |
|---|---|---|
| 888,207 | Turner | May 19, 1908 |
| 973,179 | Doan | Oct. 18, 1910 |
| 1,938,738 | Campbell | Dec. 12, 1933 |
| 2,068,317 | Farmer | Jan. 19, 1937 |
| 2,152,257 | Hewitt et al. | Mar. 28, 1939 |
| 2,672,376 | Cook | Mar. 16, 1954 |
| 2,707,134 | Cook | Apr. 26, 1955 |
| 2,821,442 | Cook et al. | Jan. 28, 1958 |

FOREIGN PATENTS

| | | |
|---|---|---|
| 668,122 | Great Britain | Mar. 12, 1952 |